(12) United States Patent
Parellada Armela et al.

(10) Patent No.: US 10,864,662 B2
(45) Date of Patent: Dec. 15, 2020

(54) FORMING FASTENER ELEMENTS

(71) Applicant: Velcro BVBA, Deinze (BE)

(72) Inventors: Luis Parellada Armela, Palafrugell (ES); Elm Aubà Gomis, Mataró (ES)

(73) Assignee: Velcro BVBA, Deinze (BE)

( * ) Notice: Subject to any disclaimer, the term of this patent is extended or adjusted under 35 U.S.C. 154(b) by 198 days.

(21) Appl. No.: 16/008,130

(22) Filed: Jun. 14, 2018

(65) Prior Publication Data

US 2019/0016023 A1 Jan. 17, 2019

Related U.S. Application Data

(60) Provisional application No. 62/531,083, filed on Jul. 11, 2017.

(51) Int. Cl.
| | |
|---|---|
| *B29C 43/22* | (2006.01) |
| *A44B 18/00* | (2006.01) |
| *B29C 43/24* | (2006.01) |
| *B29C 43/46* | (2006.01) |
| *B29K 23/00* | (2006.01) |
| *B29L 31/00* | (2006.01) |

(52) U.S. Cl.
CPC ........ *B29C 43/222* (2013.01); *A44B 18/0049* (2013.01); *A44B 18/0061* (2013.01); *A44B 18/0065* (2013.01); *B29C 43/24* (2013.01); *B29C 43/46* (2013.01); *B29C 2043/463* (2013.01); *B29C 2043/465* (2013.01); *B29K 2023/12* (2013.01); *B29L 2031/729* (2013.01)

(58) Field of Classification Search
CPC ............ A44B 18/0065; A44B 18/0049; A44B 18/0061; B29C 43/222; B29C 43/24; B29C 43/46; B29C 2043/465; B29C 2043/463; B29K 2023/12; B29L 2031/729

See application file for complete search history.

(56) References Cited

U.S. PATENT DOCUMENTS

| | | | | |
|---|---|---|---|---|
| 3,312,583 | A | * 4/1967 | Rochlis | A46D 3/005 428/88 |
| 4,775,310 | A | 10/1988 | Fischer | |
| 4,794,028 | A | * 12/1988 | Fischer | A44B 18/0049 428/100 |

(Continued)

FOREIGN PATENT DOCUMENTS

| | | |
|---|---|---|
| WO | WO 94/18864 | 9/1994 |
| WO | WO 2005/037007 | 4/2005 |

OTHER PUBLICATIONS

PCT International Search Report in International Application No. PCT/E P2018/064543, dated Sep. 17, 2018, 12 pages.

*Primary Examiner* — Jeffrey M Wollschlager
(74) *Attorney, Agent, or Firm* — Fish & Richardson P.C.

(57) ABSTRACT

Arrays of male fastener elements are formed by molding preforms in cavities defined in one or more adjacent plates and shaped to mold preform arms that extend to a plate side, such as in a cross-machine direction of a continuous molding process. The preforms may be deformed to flatten their upper surfaces and lengthen the arms. Stems of preforms have molded side surfaces and each have width, measured in the longitudinal direction of the strip, that narrows with distance from the strip surface, and also narrows with distance from a parting line extending from the strip surface to the head between the arms.

24 Claims, 14 Drawing Sheets

(56) References Cited

U.S. PATENT DOCUMENTS

| | | | |
|---|---|---|---|
| 5,260,015 A | 11/1993 | Kennedy et al. | |
| 5,505,747 A | 4/1996 | Chesley et al. | |
| 5,537,720 A | 7/1996 | Takizawa et al. | |
| 5,604,963 A | 2/1997 | Akeno | |
| 5,657,517 A | 8/1997 | Akeno et al. | |
| 5,685,050 A | 11/1997 | Murasaki | |
| 5,755,015 A | 5/1998 | Akeno et al. | |
| 5,781,969 A * | 7/1998 | Akeno | A44B 18/0065 24/452 |
| 5,800,845 A * | 9/1998 | Akeno | A44B 18/0049 425/224 |
| 5,884,374 A * | 3/1999 | Clune | A44B 18/0049 24/446 |
| 5,900,302 A * | 5/1999 | Minato | A44B 18/0049 24/442 |
| 5,900,350 A * | 5/1999 | Provost | A44B 18/0049 216/48 |
| 5,913,482 A | 6/1999 | Akeno | |
| 5,953,797 A * | 9/1999 | Provost | A44B 18/0049 23/304 |
| 6,039,556 A * | 3/2000 | Jens | A44B 18/0049 24/442 |
| 6,039,911 A | 3/2000 | Miller et al. | |
| 6,162,040 A * | 12/2000 | Clune | A44B 18/0049 264/167 |
| 6,163,939 A | 12/2000 | Lacey et al. | |
| 6,368,097 B1 | 4/2002 | Miller et al. | |
| 6,902,389 B2 * | 6/2005 | Gorman | A44B 18/0049 425/363 |
| 6,991,843 B2 | 1/2006 | Armela et al. | |
| 7,052,638 B2 | 5/2006 | Clarner et al. | |
| 7,185,401 B2 | 3/2007 | Ausen et al. | |
| 7,192,266 B2 | 3/2007 | Gallant et al. | |
| 7,217,119 B2 | 5/2007 | Clune et al. | |
| 7,350,276 B2 | 4/2008 | Minato et al. | |
| 7,516,524 B2 | 4/2009 | Provost et al. | |
| RE40,858 E | 7/2009 | Gallant et al. | |
| 8,609,218 B2 * | 12/2013 | Cheng | A44B 18/0049 24/442 |
| 8,884,374 B2 | 11/2014 | Liu et al. | |
| 9,888,746 B2 | 2/2018 | Murasaki et al. | |
| 2003/0012921 A1 * | 1/2003 | Gallant | B29C 59/025 428/100 |
| 2003/0106188 A1 * | 6/2003 | Armela | A44B 18/0049 24/451 |
| 2004/0031130 A1 * | 2/2004 | Clarner | A61F 13/625 24/452 |
| 2005/0177986 A1 * | 8/2005 | Clarner | B29C 43/46 24/452 |
| 2006/0096072 A1 * | 5/2006 | Minato | A44B 18/0061 24/452 |
| 2007/0264482 A1 | 11/2007 | Banker et al. | |
| 2014/0103567 A1 * | 4/2014 | Collins | A44B 18/0019 264/167 |
| 2014/0237779 A1 * | 8/2014 | Gallant | A44B 18/0049 24/449 |

* cited by examiner

US 10,864,662 B2

FORMING FASTENER ELEMENTS

TECHNICAL FIELD

This invention relates to arrays of male touch fastener elements and to methods of making fastener products having such fastener elements.

BACKGROUND

Male fastener elements, such as for releasably engaging loops or other fastener elements, are often molded of resin, with arrays of such fasteners extending from a common sheet. In continuous molding processes using molding rolls formed of stacked rings, it is common to mold such fastener elements to have heads that overhang in the machine (i.e., processing) direction, along the length of the product. U.S. Pat. No. 4,775,310 to Fishcer taught one such method, and U.S. Pat. No. 5,260,015 to Kennedy et al. taught how to mold such fastener elements while laminating the common sheet of resin to a flexible substrate such as a fabric. Later advances include forming molded hook strips in limited widths of a broad substrate. Various attempts have been made to cost-effectively produce fastener elements that overhang in specific directions other than the machine direction. Improved methods and fastener element shapes are sought.

SUMMARY

Aspects of the invention include unique methods of molding touch fastener hooking structures, unique fastener hooking structures themselves, and products containing such structures.

One method of molding a touch fastener hooking structure, according to a first aspect of the invention, includes forming a stack of rings with two adjacent, separable molding rings together defining a molding cavity extending inward from an outer surface of the ring stack. The two adjacent molding rings include a first ring in which the cavity extends only partially through a thickness of the ring at the outer surface of the ring stack, and fully through the thickness of the ring at a depth below the surface of the ring stack, and a second ring bounding the cavity at the surface of the ring stack. The method includes filling the molding cavity with resin contiguous with resin disposed on the outer surface of the ring stack to form a resin layer with an integral projection molded in the cavity, and then withdrawing the projection from the cavity. The projection is a touch fastener hooking structure having a stem extending from the resin layer to an overhanging head having a distal tip, the stem having a side surface facing the tip and formed against material of the first ring, and the tip formed against a ring on a side of the first ring opposite the second ring.

In some instances, the cavity extends into the second ring. For example, the cavity may extend only partially through a thickness of the second ring at the outer surface of the ring stack, and fully through the thickness of the second ring at a depth below the surface of the ring stack.

In some cases, the overhanging head has two oppositely directed distal tips formed against rings adjacent the two adjacent molding rings.

For some applications, side surfaces of the cavity are misaligned at an interface between the first and second rings, such as to form a shape discontinuity at the parting line.

In some instances, the cavity extends through three adjacent rings, including a middle ring in which the cavity is of a constant profile throughout a thickness of the middle ring.

In some cases, an innermost surface of the cavity (such as a surface that forms an uppermost surface of the head) is angled with respect to the outer surface of the ring stack.

In some embodiments, the cavity has a stem-forming portion with a cross-sectional area that decreases with distance from the outer ring stack.

An opening of the cavity at the outer surface of the ring stack may have a width, measured along the first ring, that is greatest at an interface between the first and second rings (such as where a parting line is formed on the resulting stem).

In some cases, the side surface of the stem facing the tip is formed against a surface of the first ring that is angled with respect to a side surface of the first ring.

In some instances, the withdrawn tip has a flange extending about a perimeter of the tip.

As a result of some applications of the method, the overhanging head has an arm overhanging the base layer in a single direction. The arm may have two parallel projections extending to respective tip portions formed against the ring on the side of the first ring opposite the second ring. The withdrawn projection may have a stiffening rib connecting an underside surface of the arm and the side surface of the stem.

The overhanging head may have only one arm, or may have two arms overhanging the base layer in opposite directions.

In some cases, the overhanging head overhangs the base layer in two, perpendicular directions (such as in a machine direction and a cross-machine direction). The overhanging head may define four overhanging arms extending in orthogonal directions from a central region of the head.

In some instances, the ring stack defines multiple cavities, and the withdrawn projection is one projection of an array of discrete projections molded to extend from the base layer. The array may include projections of different shapes.

In some embodiments, the rings are circular and the outer surface of the ring stack is cylindrical.

Sometimes the method also includes, before withdrawing the projection from the cavity, laminating the resin layer with a surface of a flexible substrate. The resin layer may be laminated under pressure in a nip through which the substrate passes, such as in a molding nip in which nip pressure fills the mold cavities with the resin. In some cases, the surface of the substrate is fibrous and can be a non-woven fabric or otherwise have exposed hook-engageable fibers.

In some examples, the resin layer is bounded by exposed areas of the substrate surface.

In some cases as a result of the method the resin layer is continuous in a direction perpendicular to a longitudinal axis of the ring stack.

In some examples the method also includes, after withdrawing the projection, deforming an upper surface of the projection against a heated surface. The overhanging head may overhang the base layer in a first direction, with deforming the upper surface forming ridges overhanging the stem in a second direction perpendicular to the first direction.

In some cases, deforming the upper surface advantageously causes an underside surface of the head to curve toward the base layer.

In some examples, the overhanging head overhangs the base layer in a first direction, and deforming the upper surface advantageously lengthens an overall dimension of the head in the first direction. In some cases, deforming the upper surface significantly lengthens the overhang lengths of the arms, such as by 20% or more.

A method of forming a touch fastener product, according to another aspect of the invention, features forming a resin strip having a surface from which an array of resin projections integrally extends. Each projection has a stem extending from the strip surface to a distal head having at least one arm extending laterally to overhang the strip, and a central cap. The arm has an upper surface rising from the stem to a distal tip, and the central cap overlies the stem and projects farther from the strip than an inner portion of the upper surface of the arm. The method also includes pressing downward on the resin projections with a heated surface that plastically lowers the arm and also melts the central cap sufficiently to lengthen the arm, thereby forming male touch fastening elements extending from the strip.

Preferably, forming the resin strip involves forming the projections by molding resin in closed cavities, such as cavities defined in a rotating mold roll.

In some instances, the projections of the formed resins trip each have two, oppositely directed arms, with the cap of each projection disposed between the arms. In some cases, pressing downward on the resin projections lengthens both arms. The central cap may form a peak between the arms, and pressing downward on the resin projection causes resin of the peak to flow laterally.

In some examples, pressing downward on the resin projections causes lower surfaces of the arms to bend toward the strip surface.

In some cases, pressing downward on the resin projections forms ridges extending beyond the stems in a direction perpendicular to the arms, to overhang at least one side of each stem.

In some embodiments, the heated surface is a peripheral surface of a roller, such as a roller that bounds a nip through which the formed resin strip passes. The formed resin strip may be trained about the roller, with the distal heads of the projections in contact with the peripheral surface through a roller contact angle. In some cases the formed resin strip is trained about two rolls adjacent the roller, such that the distal heads are held in contact with the peripheral surface between the rolls.

In some examples, the distal tips of the arms of the projections of the formed strip extend farther from the strip surface than the central caps. In some cases, after pressing downward on the resin projections the distal tips are closer to the surface of the formed strip than are central portions of the heads.

In some embodiments, the projections are formed to have stiffening ribs connecting underside surfaces of the arms with side surfaces of the stems.

In some cases, the distal tips are formed with flanges extending about their perimeters, and pressing downward on the resin projections melts the flanges at the upper surfaces of the arms while retaining the flanges under the arms.

In some applications of the method, pressing downward on the resin projections significantly lengthens the arms, such as by at least 20 percent, or even at least 30 percent.

According to another aspect of the invention, a flexible fastener product has an elongated resin strip with lateral edges and that defines a longitudinal direction, and an array of discrete, spaced-apart fastener elements carried on one side of the strip. Each fastener element has a stem of resin extending integrally from the strip and forming, together with resin of the strip, a single contiguous mass of resin, and a head disposed at a distal end of the stem and having arms that extend in opposite directions from the stem toward the lateral edges of the strip to form overhangs for retaining fibers. The stems have molded side surfaces and each have width, measured in the longitudinal direction of the strip, that narrows with distance from the strip surface, and also narrows with distance from a parting line extending from the strip surface to the head between the arms.

In some embodiments, the arms have molded underside surfaces and extend to molded distal tip surfaces. In some cases, the distal tip surfaces are directed downward toward the resin strip.

In some examples, the heads have flat upper surface regions directly above the stems. In some instances, the heads have ridges overhanging the stem side surfaces in the longitudinal direction.

Preferably, the fastener elements are more than twice as long, measured laterally and perpendicularly to the longitudinal direction, as they are tall.

For many applications, for at least a majority of the fastener elements, each arm has an overhang length, measured laterally and perpendicularly to the longitudinal direction, more than 50 percent of an overall height of the fastener element.

Some embodiments of the flexible fastener product also include a flexible substrate to which an opposite side of the resin strip is laminated, such as with the strip disposed between exposed surface regions of the substrate. In some examples, resin of the strip directly contacts and encapsulates surface features of the substrate. The substrate may have a fibrous surface, such as a surface of a non-woven material. In some cases, fibers of the substrate are releasably engageable by the fastener elements.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
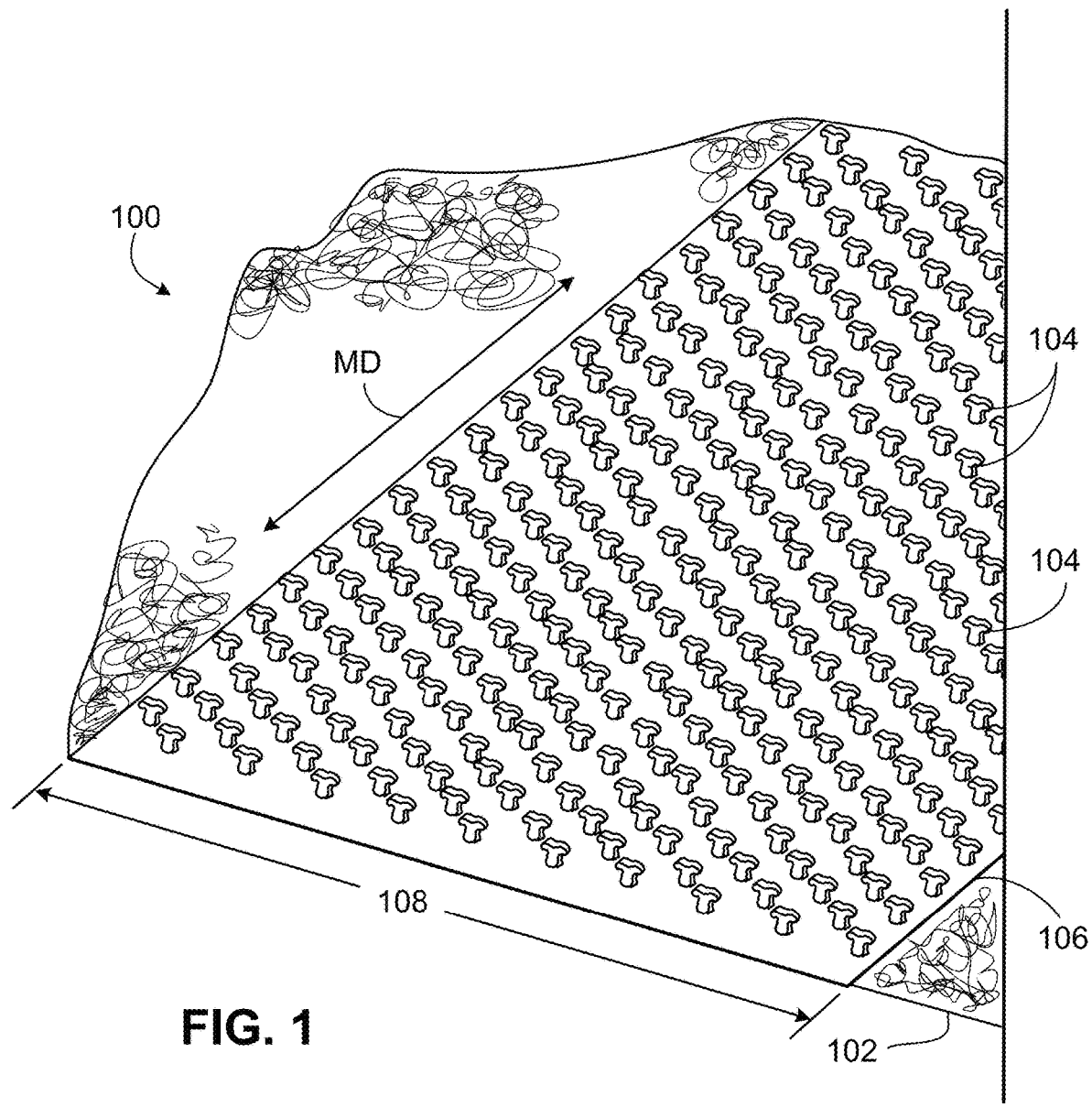
FIG. 1 is a partial end view of a touch fastener laminate.

Referring first to FIG. 1, touch fastener 100 includes a flexible substrate 102 and an array of touch fastener elements (e.g., hooks or hooking structures) 104. Fastener elements 104 have discrete resin stems molded to extend from a solidified base layer 106 of flowable resin (e.g., polypropylene, polyethylene, or any other suitable resinous material) supported by the substrate surface. Base layer 106 is of limited width 108, with exposed areas of substrate on either side, and extends continuously in the direction in which the base was molded in a continuous process (i.e., in the machine direction MD). In this example, substrate 102 is a non-woven, fibrous web with exposed fibers on a rear face of the substrate that are engageable by structures 104. Substrate 102 may be, for example, what is known in the non-woven industry as a staple fiber non-woven, a needle-punched non-woven, a spunbonded web such as a point un-bonded web, a spunbonded/meltdown/spunbonded (SMS) web, etc. Alternatively, substrate 102 may be a textile product such as a knit or woven product.

Base layer 106 is about 0.08 to 0.10 mm thick and is permanently secured to substrate 102 by being formed from molten resin directly on the surface of the substrate, such that resin of the layer encapsulates surface fibers of the substrate as it solidifies, without the necessity of a separate adhesive or other attachment means. The width 108 of the layer may be, for example, less than 25 mm, with similar layers (not illustrated) running in parallel along the substrate and spaced from adjacent layers by 75 mm or more. In this illustrated example, base layer 106 is about one cm in width and carries 20 columns of elements 104, with adjacent columns staggered in the machine direction such that the elements are arranged in an array of columns and offset rows, with about 300 fastener elements per square centimeter. For many applications, there are about 18 columns per centimeter of base layer width, and width 108 between 15 and 30 mm. For some applications, one base layer may carry two groupings of elements, each covering a width of about 15-20 mm and separated by an element-free width of about 10 mm.

Figure 2:
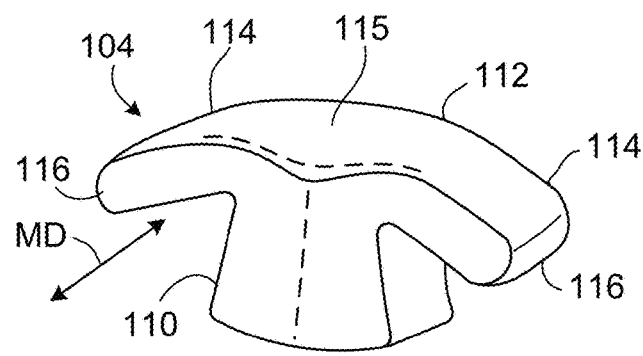
FIG. 2 is an enlarged view of a single touch fastener element.

A single one of the elements 104 is shown in FIG. 2. It has a single molded resin stem 110 rising essentially perpendicularly and integrally from the base layer, and a head 112 at the distal end of the stem. Head 112 has two arms 114 that extend from a central part of the head directly over the stem, to overhang the base layer in opposite directions. The central portion 115 of the head is generally flat directly over the stem, with the upper surfaces of arms 114 curving gently downward to tips 116. The widest part of fastener element 104 (in the machine direction) is mid-way between tips 116, at the central portion of the head. The width (in the machine direction) of the arms slightly narrows toward the tips. The stem also tapers slightly in width from its center, as well as from the base layer. Arms 114 are generally thinner (in a direction normal to the plane of the base layer) than their width, and have an overhang length (as discussed below) about ⅓ of the overall length (tip to tip) of the fastener element and more than 50% of an overall height of the fastener element. The stem has molded side surfaces and has a width, measured in the longitudinal direction of the strip, that narrows with distance from the strip surface, and also narrows with distance from a parting line extending from the strip surface to the head between the arms. The arms themselves have molded underside surfaces and extend to molded distal tip surfaces that are directed downward toward the resin strip or base layer. The heads has ridges, formed in a post-forming operation as discussed below, overhanging the stem side surfaces in the longitudinal direction. As noted below, fastener element 104 is more than twice as long, measured laterally and perpendicularly to the longitudinal direction (from tip to tip), as it is tall.

Figure 3:
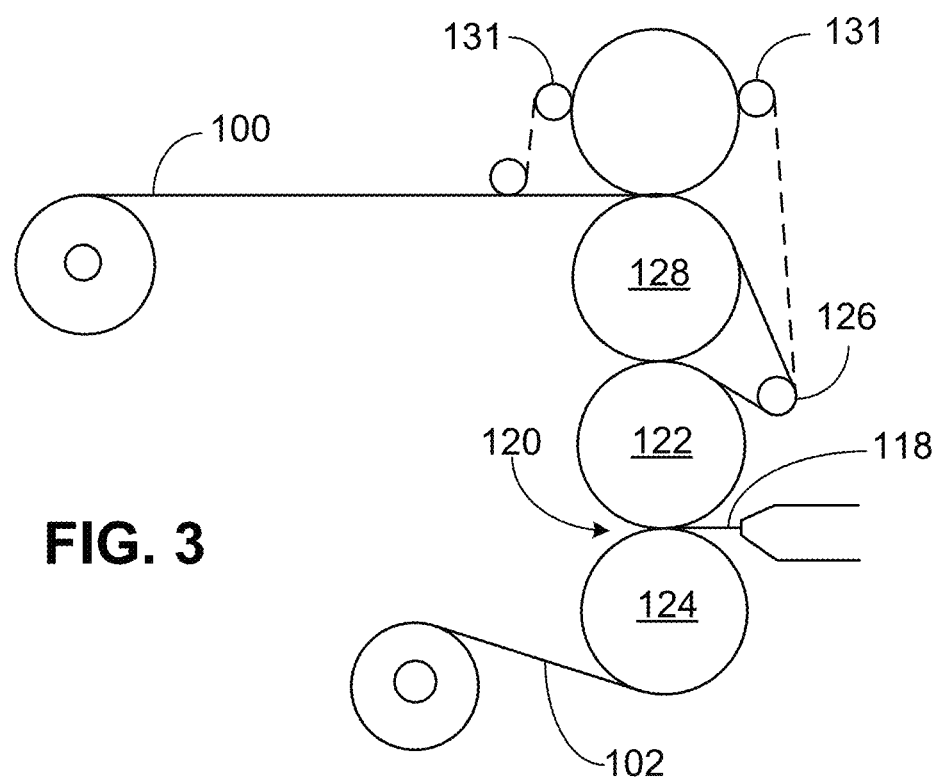
FIG. 3 is a schematic illustration of an apparatus and method for forming laminated fastener products.
Figure 4:
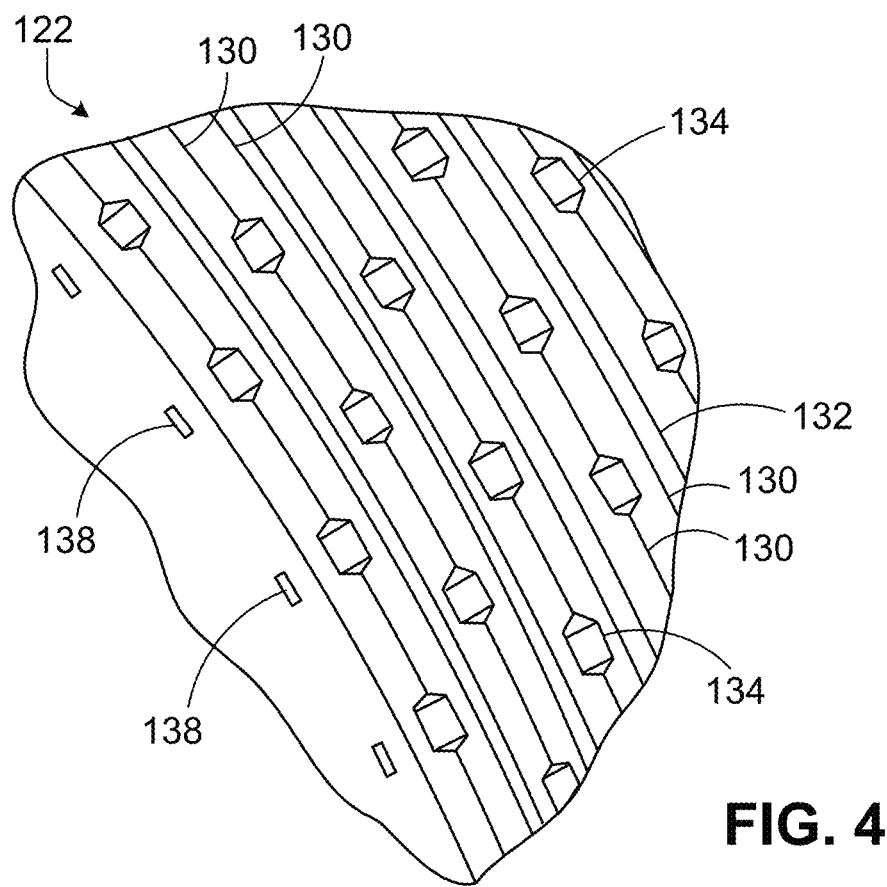
FIG. 4 is a partial perspective view of the surface of a mold roll.

Referring next to FIG. 3, fastener product 100 is formed in a continuous process in which the resin base layer is first formed with an array of molded fastener element preforms on the substrate, and then the preforms are reformed into the fastener elements. The preforms themselves are hooking structures in that they are capable of snagging fibers. Molten resin 118 is introduced into a nip 120 between a mold roll 122 and a counter-rotating pressure roll 124. Substrate 102 is trained around pressure roll 124 to enter the nip with the resin, such that pressure in nip 120 laminates the resin to the substrate. As discussed in more detail below, mold roll 122 defines discrete, closed cavities extending inward from its cylindrical outer surface, in which the fastener element preforms are molded of the same flow of resin that forms the base layer on the surface of the mold roll. Pressure in nip 120 forces some of resin 118 into the mold roll to fill the cavities. Mold roll 122 is chilled to solidify the resin as it is carried on the periphery of the roll, until it is stripped from the roll by passing the substrate and molded resin about a stripping roll 126. Leaving stripping roll 126, the laminated product passes between an anvil roll 128 and a heated reforming roll 129 before being spooled for shipment.

Referring next to FIGS. 4-6B, the peripheral surface of mold roll 122 is formed by aligned edges of several thin circular rings, including mold rings 130 and spacer rings 132. Adjacent pairs of mold rings define between them a series of discrete molding cavities 134, of which the openings can be seen at the surface of the roll. Each pair of mold rings is sandwiched between two spacer rings 132. The exposed side surface of the leftmost mold ring 130 in FIG. 4 would normally be covered by another spacer ring 132. The cavities 134 are formed by aligned cavity sections 136 defined in each of the two adjacent mold rings 130 of a pair.

Figure 5:
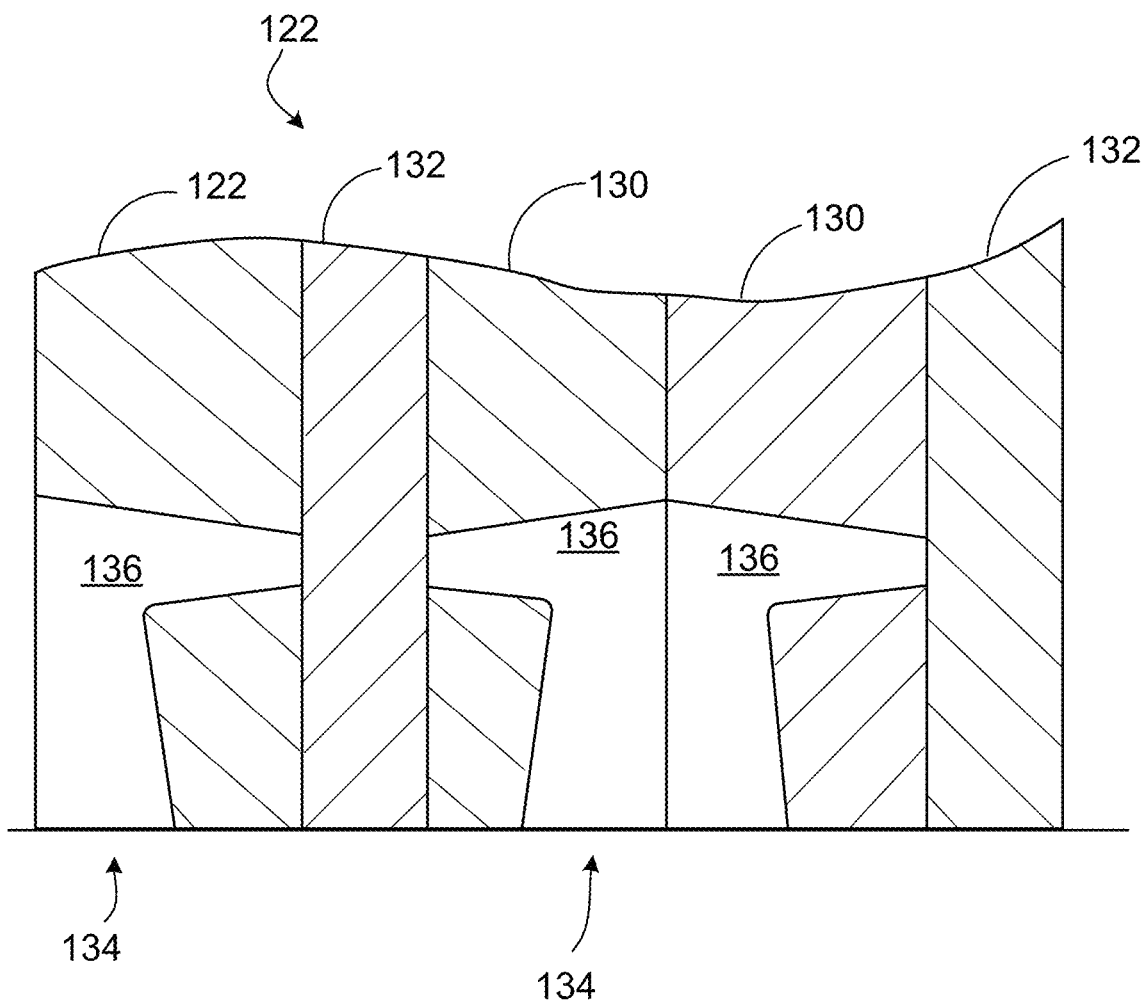
FIG. 5 is a cross-section view through an edge region of a mold roll.
Figure 6A:
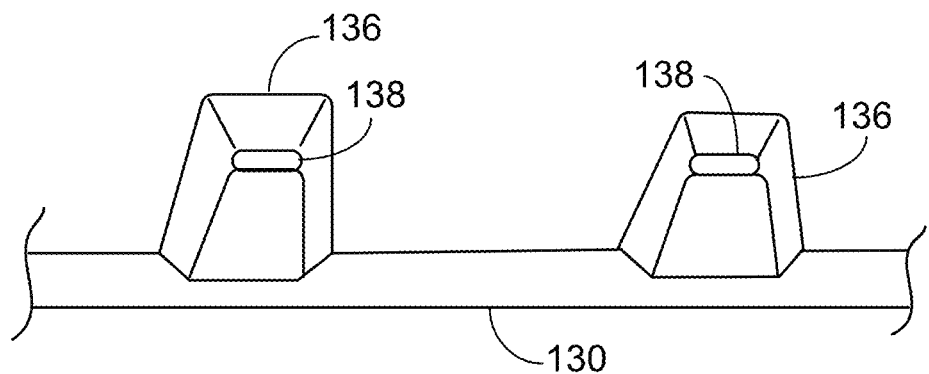
FIG. 6A is a perspective view of an edge of a single mold ring from one side of the ring.
Figure 6B:
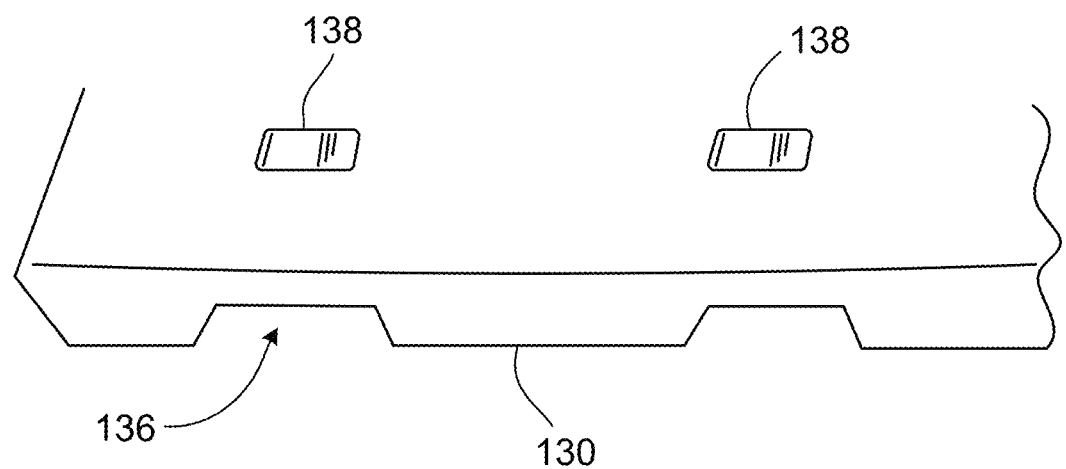
FIG. 6B is the same view but from the other side of the ring.

As seen in FIG. 5, the cavity extends across the full width of both mold rings 130 in the head-molding region of the cavity, and is bounded by the side surfaces of the adjacent spacer rings 132, at holes 138 through the side surface of the mold ring. Alternatively, the head-molding regions of the cavities can be bounded by the side surfaces of adjacent mold rings, by stacking the mold ring pairs without separating spacer rings and with the cavities appropriately positioned in adjacent pairs. Rotational alignment of the adjacent mold rings results in alignment of the cavity sections 136 as shown, but as described below, partial alignment or complete misalignment are useful in some applications. The side ring surfaces bounding the cavity sections are generally planar and tapered, as indicated in FIG. 6A, such that the machine-direction length of the stem is greatest at the interface between mold rings. The surfaces forming the top and bottom surfaces of the arms are also tapered. Such a cavity section can be readily formed in the rings, such as by plunge EDM or by laser. In this example, the mold rings 130 are each 0.2 mm in thickness and the spacer rings are each 0.1 mm thick.

Figure 7:
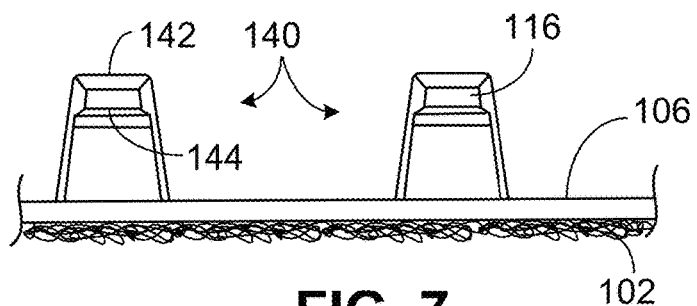
FIG. 7 is a side view of a pair of adjacent fastener element preforms.

If demolded without permanent distension, the fastener element preforms 140 would generally preserve their molded shape, the shape of the cavities in which they are molded. Such a shape is illustrated in FIGS. 7 and 9 and in the molded preform shown in FIG. 8. Such a preform can itself be considered a hooking element capable of releasable engagement of fibers in a touch fastening. As shown in FIG. 7, the narrowest portion of the as-molded preform 140, in the machine direction, is at tip 116, which has a machine direction width of 0.10 mm and a thickness of 0.04 mm. The upper surfaces 142 of the arms slope downward to tips 116, and the underside surfaces 144 of the arms slope upward to tips 116. At the base layer, the stem has a machine direction width of 0.22 mm at its center, narrowing to a width of only 0.15 mm at the peak of the head. The entire height of the preform, measured from the base layer, is only 0.25 mm. In some cases, the preform is of a greater molded height than the cavities, due to stretch during demolding.

Figure 9:
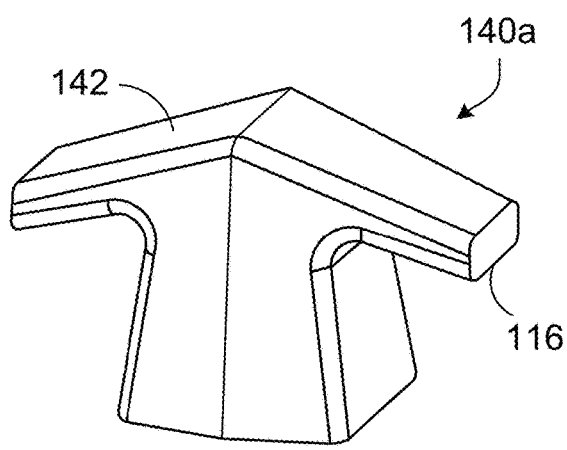
FIG. 9 is a perspective view of a second embodiment of fastener element preform.
Figure 9A:
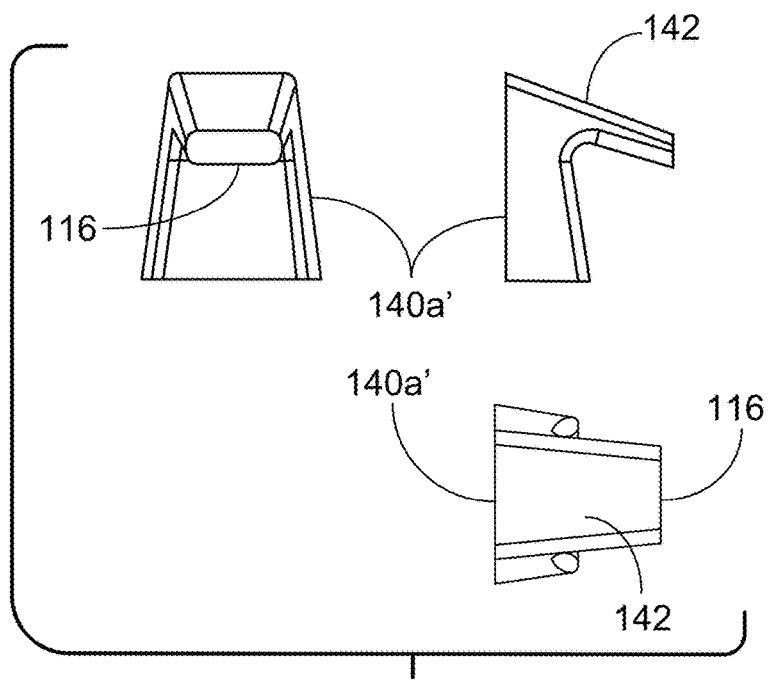
FIG. 9A shows three orthogonal views of another fastener element preform.

An alternative preform shape is show in in FIG. 9. Preform 140a has steeper upper arm surfaces 142, and the underside arm surfaces slope downward to tips 116 rather than upward. Otherwise, the preform of FIG. 9 is identical to those shown in FIG. 7. The preform 140a' of FIG. 9A is a single-armed preform molded in only one ring, using one of the mold rings for making the two-armed preform 140a of FIG. 9, sandwiched between two solid spacer rings.

Figure 10A:
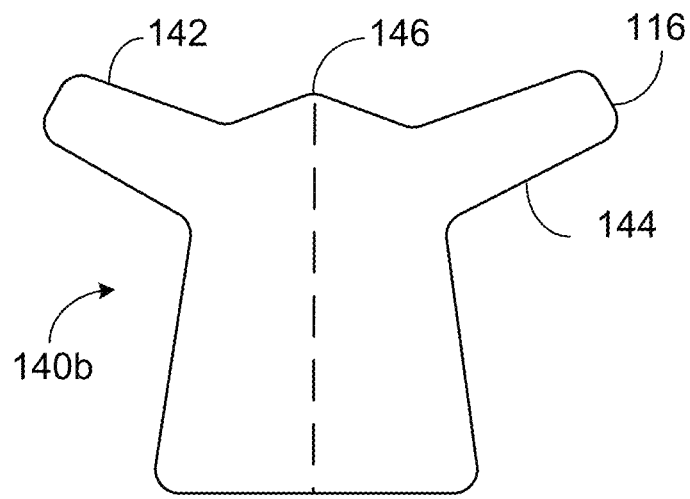
FIGS. 10A-10D sequentially illustrate post-forming the head of a fastener element preform.
Figure 10B:
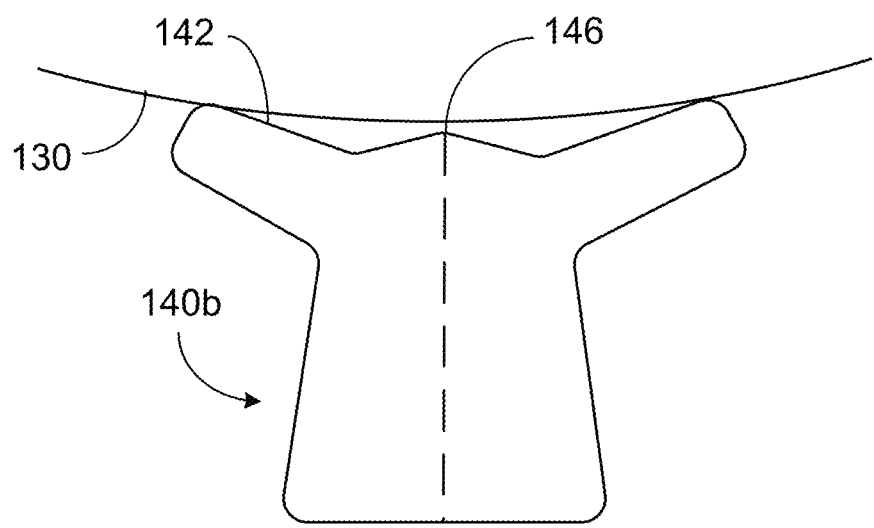
Figure 10C:
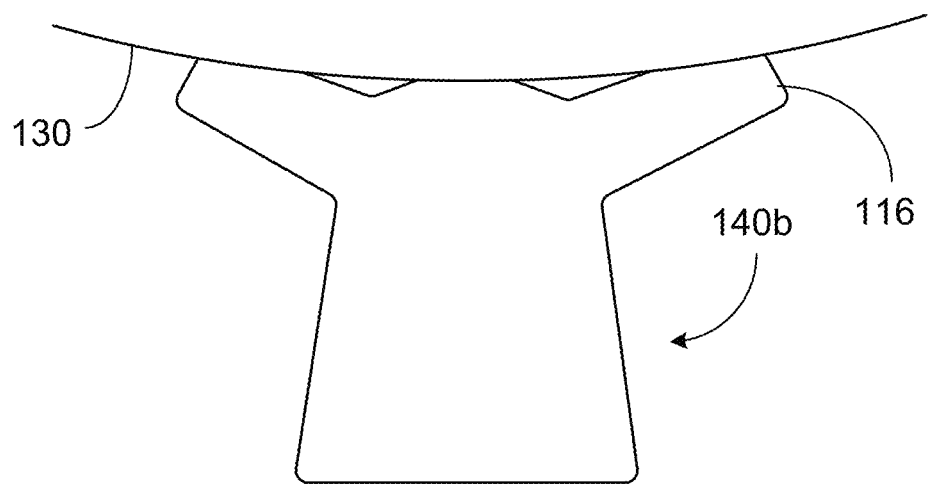
Figure 10D:
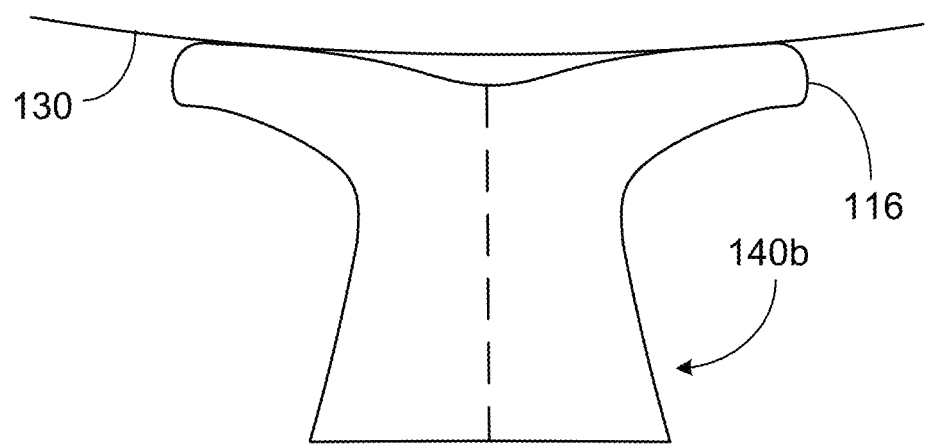
Figure 11:
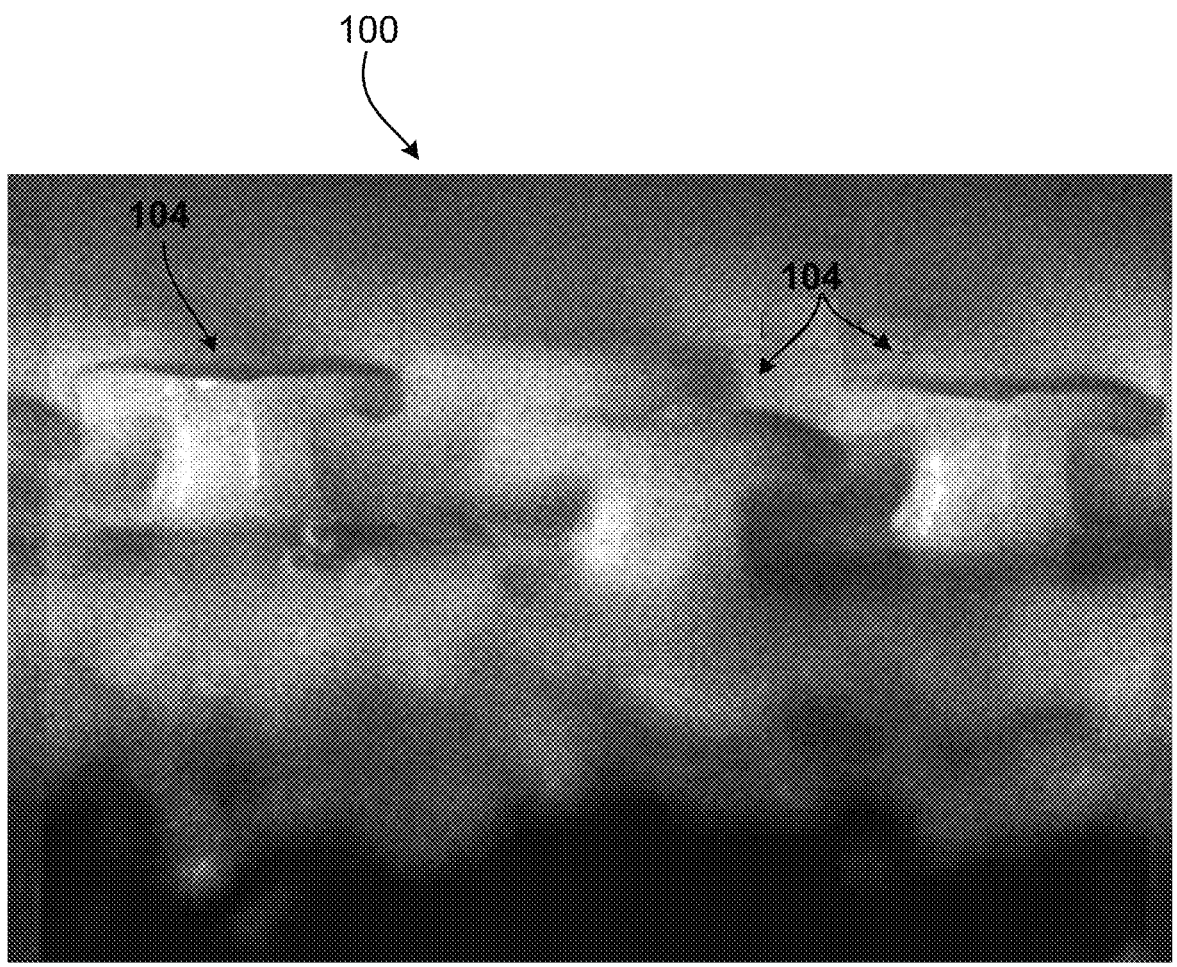
FIG. 11 is an enlarged photograph showing a fastener product with post-formed preforms, viewed in the machine direction.

With many resins, the as-molded preforms do not preserve the shape of the cavities in which they were molded. Due to plastic distension of the heads as the molded preforms are pulled from their closed cavities, the arms of the demolded preforms 140b will generally be deformed to extend upward, higher than the peak 146 of the preform head above the stem, as shown in FIG. 10A. For example, peak 146 may be about 0.25 mm from the base of the preform (the overall height of the fastener element preform having been plastically stretched during demolding), whereas the tips of the arms may be at 0.26-0.30 mm from the base. Referring sequentially to FIGS. 10B-10D, as these preforms 140b are pressed against the heated reforming roll 129 (heated, for example, to a surface temperature of 130 C), the arms are pressed downward until the roll contacts and melts peak 146 (e.g., contacts at a height of 0.40 mm from the base), causing resin of the peak and adjacent surfaces to flow: both in the machine direction to form slight overhangs beyond the stem, and in the cross-machine direction toward the tips, effectively lengthening the arms and resulting in the fastener element 104 shown in FIG. 2, having an overall height of about 0.38 mm, for example. In some cases, this process is sufficient to cause the arms to curve downward toward the base layer, effectively causing slight crooks for fiber retention, as seen in the enlarged photograph of FIG. 11. This example was molded and post-formed from a mix of about 70% polypropylene and 30% softer resin, at a line speed of about 50 meters per minute. Useful product was also produced from essentially 100% polypropylene homopolymer, at similar speeds.

Figure 12A:
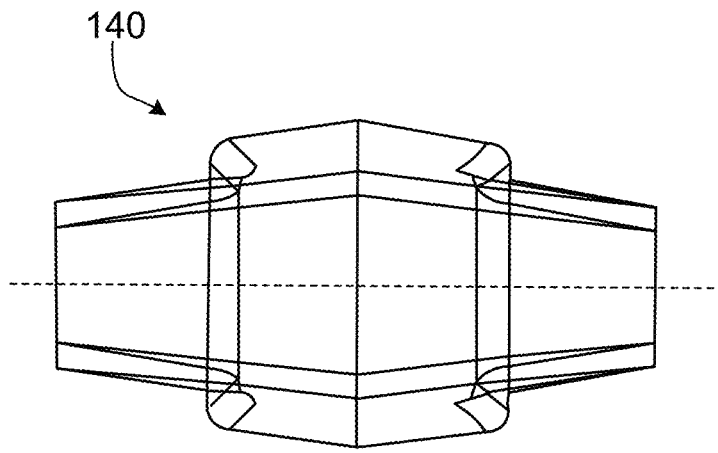
FIGS. 12A-12C show, in top view, two-armed fastener element preforms formed in cavities in different states of alignment.
Figure 12B:
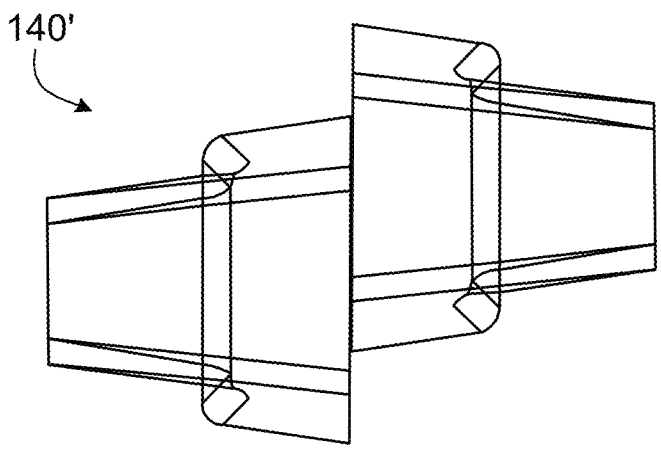
Figure 12C:
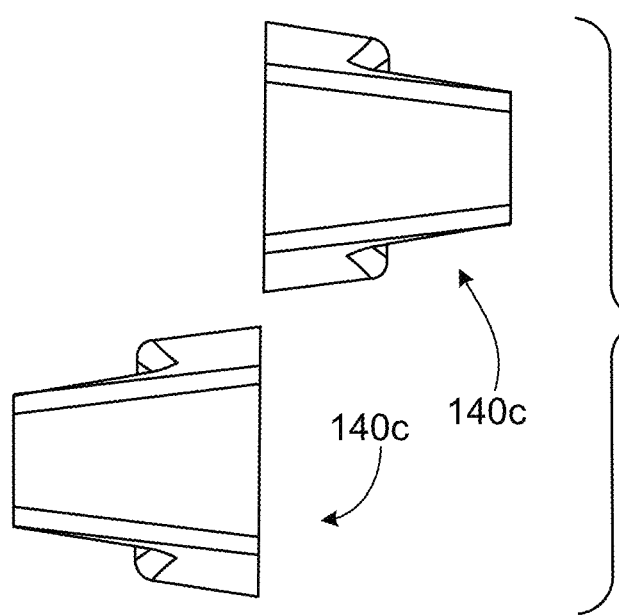

Referring now to FIGS. 12A-C, perfect alignment of mating cavity sections is not always necessary or even, in some cases, preferable. For many applications, the adjacent mold rings will be rotationally aligned to form cavities in which the stem-forming surfaces align on both sides of the cavity at the interface plane between the rings, to mold the fastener element preform 140 shown in FIG. 12A. In some other cases, the cavity sections will be in only partial alignment, such that they together form one contiguous cavity that forms a stem with a step at the interface plane, resulting in the fastener element preform 140' shown in FIG. 12B. With complete misalignment between adjacent cavity sections, two spaced single-tipped preforms 140c are formed, one in each cavity section, as shown in FIG. 12C. The mold rings may be purposefully misaligned, or only partially aligned, or the cavity sections in each ring spaced such that some align as in FIG. 12A while others are partially or completely misaligned, such as to form the fastener element preforms 140' or 140c. The preforms shown in these figures may themselves be considered hooking structures in some applications, and may be post-formed as discussed above.

Figure 8:
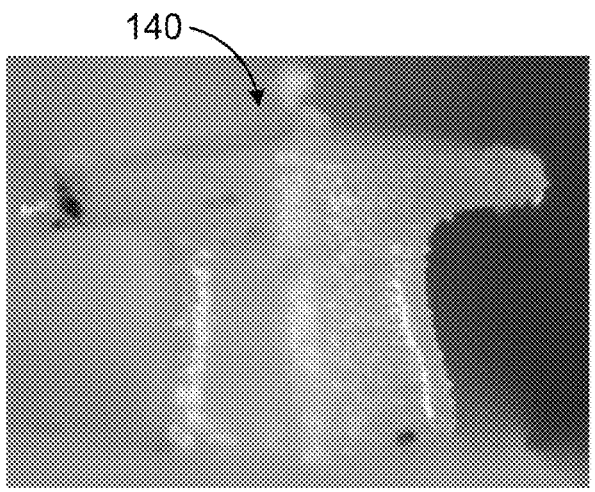
FIG. 8 is a photograph of a fastener element preform molded of silicone.
Figure 13B:
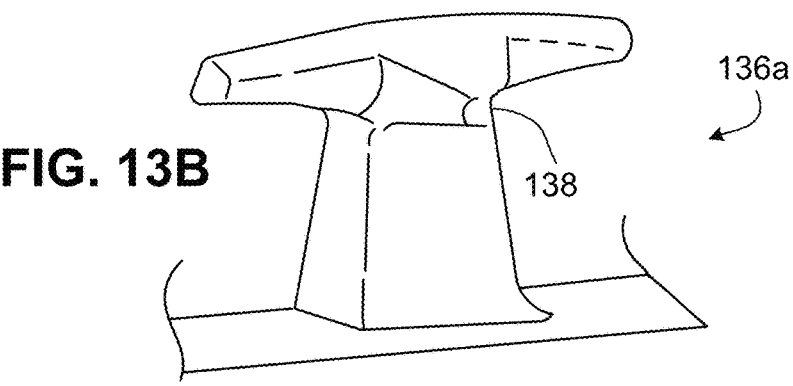
FIG. 13B shows a cavity section for forming half of the preform of FIG. 13A.
Figure 13A:
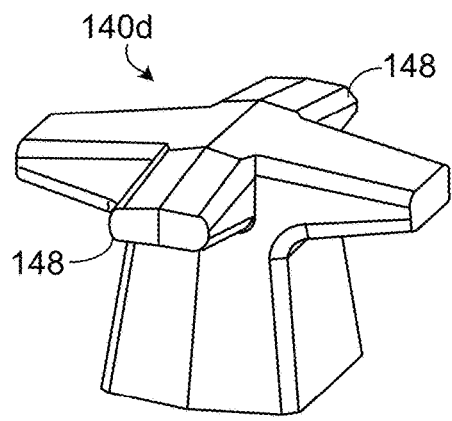
FIG. 13A is a perspective view of a first four-armed fastener element preform.
Figure 14:
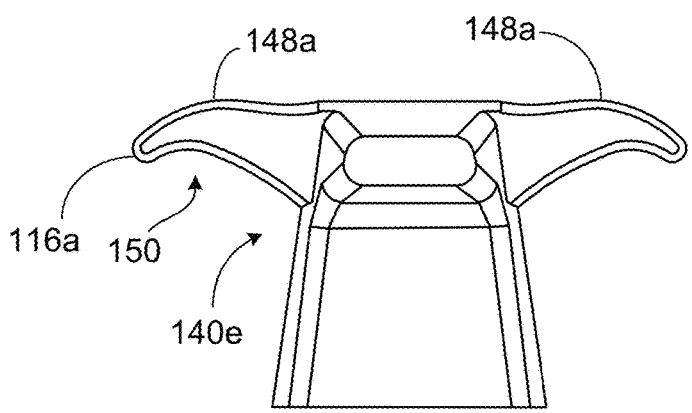
FIG. 14 is a side view of a second four-armed fastener element preform.

Referring next to FIG. 13A, fastener element preform 140d has the same profile as the one shown in FIG. 8, but with the addition of two arms 148 extending perpendicular to the arms, molded to extend in the cross-machine direction, such that the complete preform has four, orthogonally directed arms extending from a central stem. Such a preform can be molded in two aligned cavity sections 136a as shown in FIG. 13B Fastener element preform 140e of FIG. 14 similarly has four arms, two cross-directional arms as in the preforms described above and two arms 148a extending in the machine direction and ending in curved tips 116a that point slightly downward toward the base layer, such that the underside surfaces of arms 148a define crooks 150 for retaining fibers. It will be evident how to shape mating cavity sections to mold the shape shown in FIG. 14, which can be employed directly as a hooking element or post-formed as discussed above. Such cavity sections can also be used individually, to form three-projection preforms. As discussed above with respect to FIGS. 10A-D, all four arms of each of the preform shapes shown in FIGS. 13A and 14 may distend during demolding and benefit from being pressed back downward after molding. Such pressing can be accomplished by a heated roller or platen that also causes the effective lengthening of all four arms.

Figure 15:
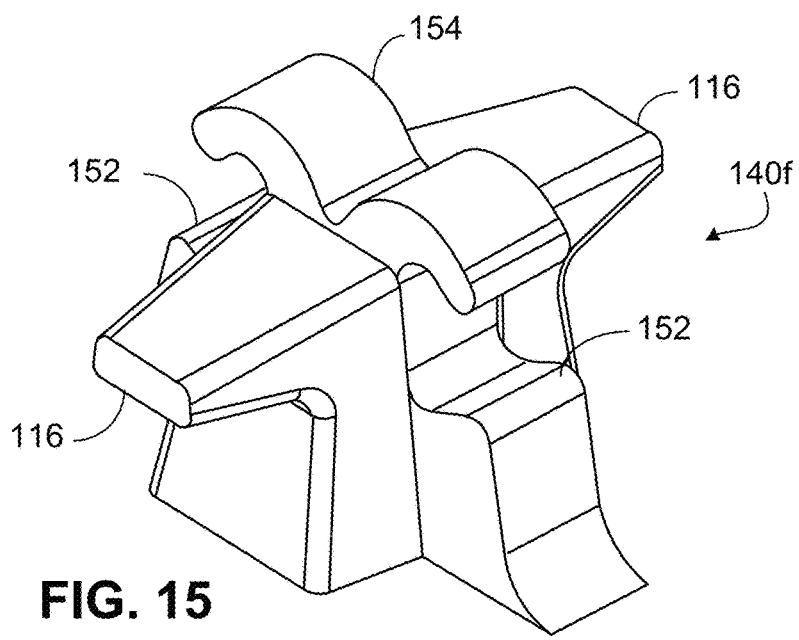
FIG. 15 is a perspective view of a preform formed in a stack of three mold rings.

Referring next to FIG. 15, preform 140f is formed in a cavity consisting of three aligned cavity sections defined in three corresponding mold rings: left and right mold rings each defining a cavity section 136 as shown in FIG. 6A, and a central ring cut all the way through with a profile of the hook shape taught in FIG. 1 of U.S. Pat. No. 7,516,524, the entire contents of which concerning hook shape and manufacturing method are incorporated herein by reference. As discussed above, the cavity sections defined by the left and right mold rings extend all the way through to the opposite sides of such rings, with the tips 116 of the arms extending in the cross-machine direction formed against spacer rings adjacent the left and right mold rings. Preform 140f may be used as-molded, with only a gentle knocking down of any overly distended head features, or may be post-formed with a heated roll as discussed above. Post-forming may cause the machine-direction heads 154 to partially melt and blend with the upper surfaces of the cross-directional heads, while leaving an overhang above the knees 152 of the preform, for fiber engagement in the machine direction.

Figure 16:
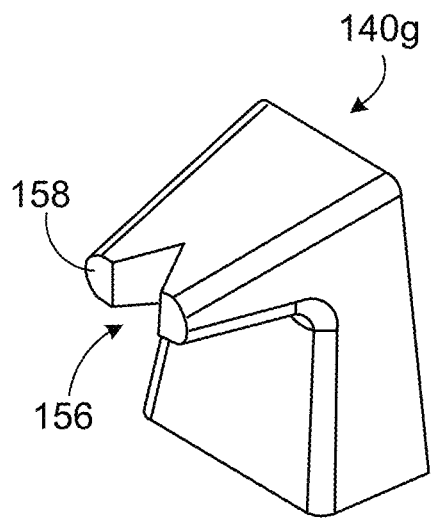
FIGS. 16 and 17 show fastener element preforms with bifurcated arms.
Figure 17:
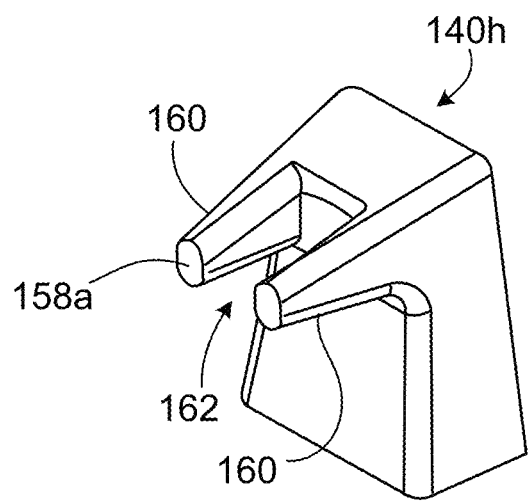

The cross-machine arms of the above-described fastener element preforms all ended in distal tip surfaces extending across the machine direction length of the tips. In the examples of FIGS. 16 and 17, the tips themselves are bifurcated, ending at distal tip surfaces separated in the machine direction. In preform 140g of FIG. 16, the arm defines a V-shaped notch 156 extending in from the distal end of the arm and separating the tip into two sections, each terminating at a respective vertical end surface 158. The ring defining the cavity for forming preform 140g will have two corresponding holes at which the end surfaces are formed, on either side of a rib of ring material forming the notch. Otherwise, the cavity will be of the shape of cavity section 136 of FIG. 5. Two such cavities can be aligned to form a two-arm version of preform 140g. Preform 140h of FIG. 17 is formed to have two oval-sectioned projections ending at flat vertical end surfaces 158a formed at corresponding side holes of the mold ring. Projections 160 define between them a wide recess 162 for retaining fibers. A two-arm version of preform 140h may be formed by aligning two such mold cavity sections.

Figure 18:
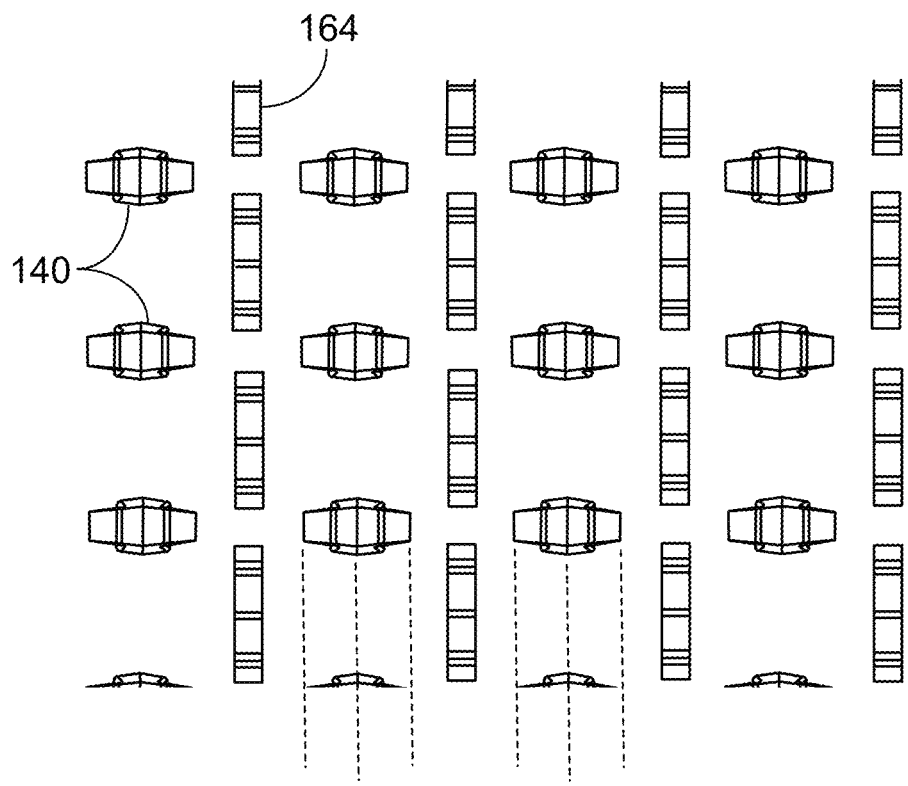
FIGS. 18 and 18A show a fastener product with an array of different types of fastener elements.
Figure 18A:
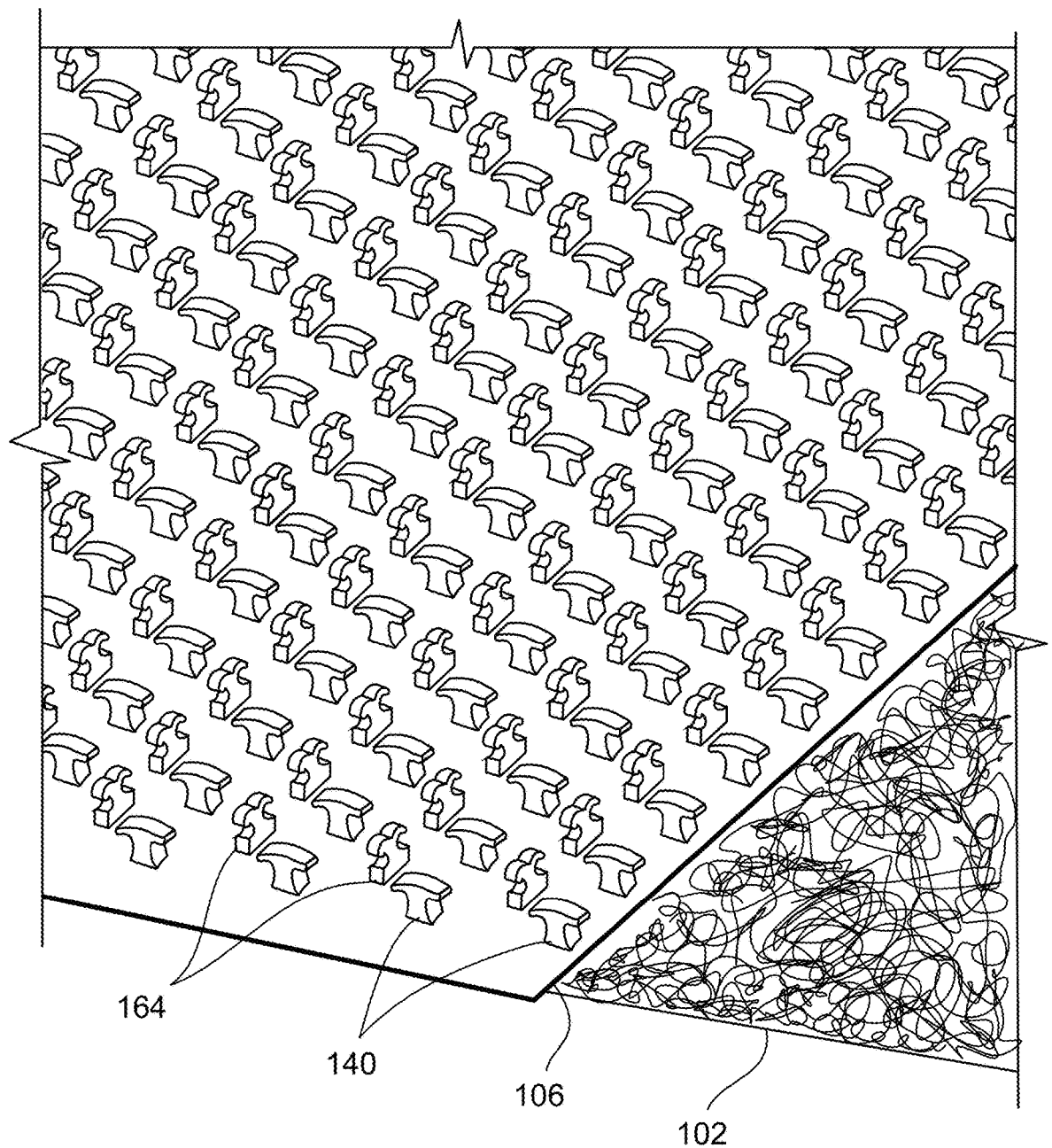

Any of the cross-machine projecting fastener element preforms discussed above can be combined in an array with machine-direction projecting fastener elements, to provide the desired fastening performance in each direction. For example, FIGS. 18 and 18A show an array of cross-machine fastener element preforms 140 interspersed with columns of machine-direction palm tree fastener elements 164. Shown in dashed lines at the bottom of the figure are the locations of sides of mold rings from which a part of the array is molded. The palm tree fastener elements 164 can be molded to be slightly shorter than the cross-machine fastener element preforms 140, such that post-forming of the preforms results in an array of fastener elements of both types that are essentially of the same height. Alternatively, the surface of the reforming roll 129 of FIG. 3 can be configured with grooves to accommodate taller machine-direction palm tree or J-hook fastener elements 164 while post-forming the cross-machine fastener element preforms 140.

Referring back to FIG. 3, for post-forming the heads of various preforms discussed above, reforming roll 129 is heated sufficiently to cause the resin forming the peaks of the preforms to flow under pressure of the reforming roll, both in the machine direction and laterally (in the cross-machine direction) to effectively lengthen the arms. The extent of melting and flow can be controlled by roll temperature, nip pressure, and the length of time the heat and pressure are applied to the upper surfaces of the preforms. The latter can be adjusted by line speed and/or by the circumferential distance about which the preforms are held against reforming roll 129. To this end, the system may be optionally equipped with adjustable positioning rolls 131, one on either side of the reforming roll and repositionable to vary the contact time against the reforming roll.

Figure 19:
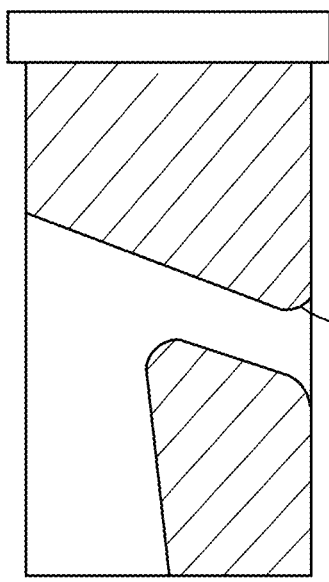
FIG. 19 is a section view through the edge of a mold ring electro-formed at the tip opening.
Figure 20:
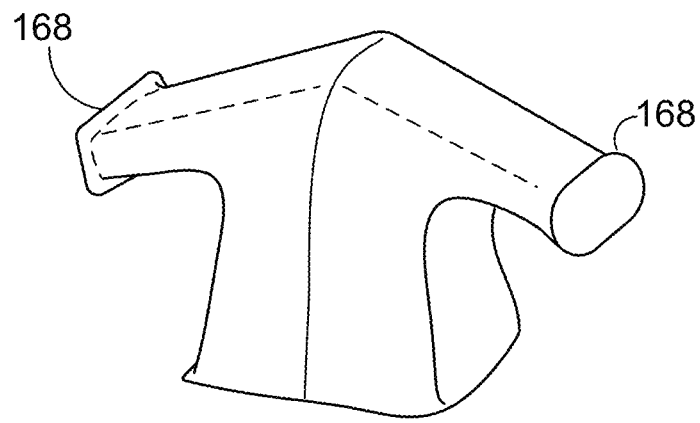
FIG. 20 is a perspective view of a fastener element preform molded in two plates with electro-formed tip openings.

Referring next to FIGS. 19 and 20, in some cases the edges 166 of the holes 138 in which the arm tips are formed are intentionally burnished or chamfered to mold a thin lip 168 about the arm tips. Such a feature can be formed in the mold ring, for example, by known electro-forming techniques after the overall cavity shape has been formed by laser machining. Other tip features can be formed by a second laser machining step performed from the tip side of the mold ring. Lips 168 can provide further features for snagging fibers in use. Post-molding deformation of the head, as discussed above, can be done so as to melt the lip or flange at the upper edges of the arm tips, while leaving them intact under the arms for enhanced fiber retention.

Figure 21:
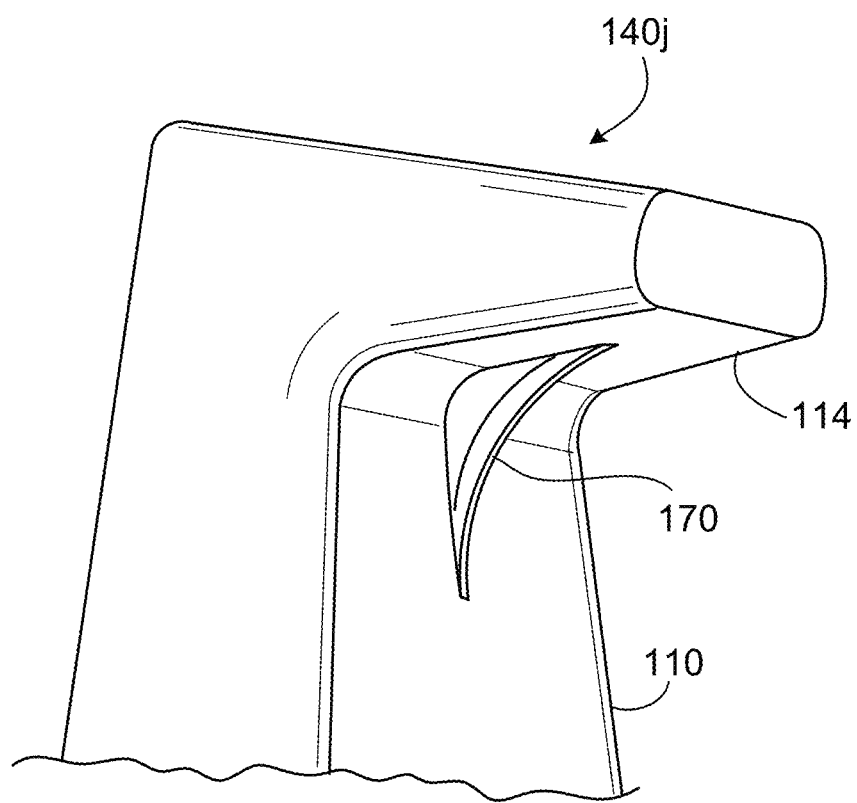
FIG. 21 shows a preform with a molded underarm stiffening rib.

The cavity sections formed in the mold rings can be shaped to form additional features. For example, FIG. 21 shows a fastener element preform 140j with a molded stiffening rib 170 spaced from the machine direction edges of the preform and connecting the underside surface of the arm 114 with the side surface of the stem 110. Such stiffening ribs may be formed in corresponding grooves cut into the mold ring material, such as by EDM or laser, and can mitigate distension of the arms during demolding.

Figure 22:
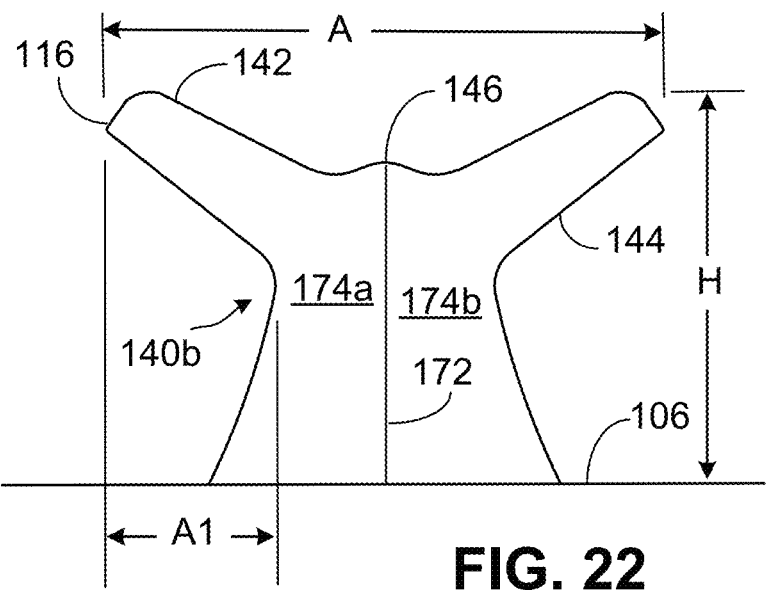
FIG. 22 is a representative side view of a molded preform.
Figure 23:
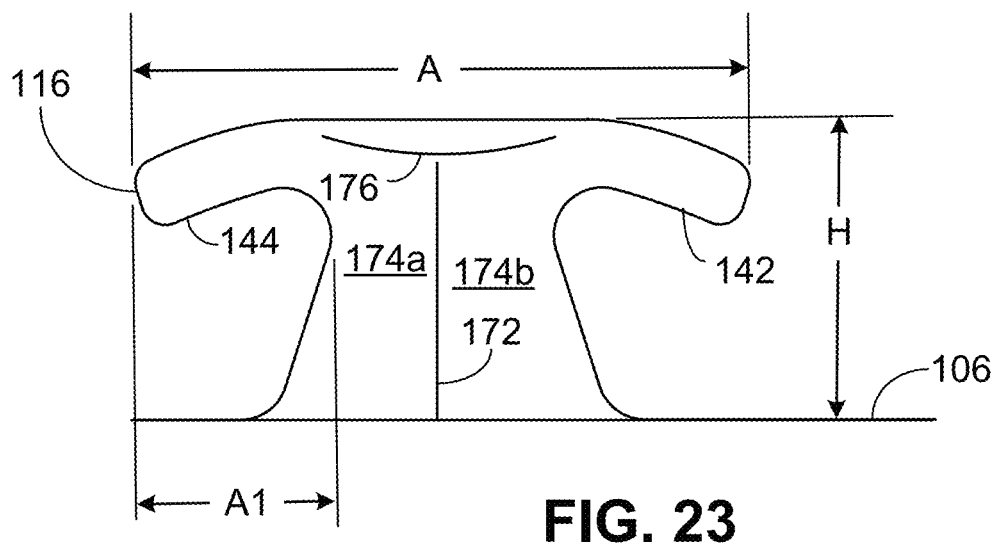
FIG. 23 is a representative side view of a preform following post-forming

As discussed above, the post-forming process can be performed in such a way that not only eliminates the central molded peak of the preform, but also lengthens the arms as they are plastically displaced downward. Referring to FIG. 22, the molded preform 140b has an overall height 'H' from base layer 106 of about 0.25 mm, with the raised tips 116 forming the highest part of the preform. The pre-form has a length 'A', measured in the cross-machine direction between outermost edges of the tips, of about 0.37 mm. Prior to post-forming, arms 142 each have an overhang length A1, measured laterally from an innermost point on the stem surface facing the arm to an outermost edge of the arm tip, of about 0.095 mm. Also visible in this view is the parting line 172 running centrally up the stem from the base layer to the peak 146 between molded stem side surfaces 174a and 174b. Referring next to FIG. 23, after post-forming the height 'H' has been reduced to about 0.20 mm, with the central portion of the head forming the highest point of the structure as the arms of the post-formed structure bend somewhat toward base layer 106, with tips 116 directed toward the base layer rather than away from the base layer. The overall length 'A' of the post-formed fastener element has been increased to about 0.46 mm, and the arm overhang length A1 has been increased to about 0.13 mm. In other words, the overall height 'H' has been decreased by about 20%, while the overall length 'A' has been increased about 25% and the arm overhang length A1 increased about 35%. The resulting fastener element is thus over twice as long as it is high, and has arms that have overhang length A1 of more than 50% of the overall fastener element height. But for the downward redirection of the arms and the formation of ridges 176 on either side of the head, the side surfaces of stem and head remain essentially as-molded, as do the underside surfaces of the arms and the end faces of tips 116. In many cases, the surface modification caused by post-forming is only to the central portion of the top surface of the head (directly above the stem) and the upper portion of the side surfaces of the head where ridges 176 are formed. Temperature, speed and pressure of the post-forming process can be adjusted to achieve such an effect, in accordance with the selected resin and the preform shape and dimensions.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of molding a touch fastener hooking structure, the method comprising
    forming a stack of rings comprising two adjacent, separable molding rings together defining a molding cavity extending inward from an outer surface of the ring stack, the two adjacent molding rings comprising
        a first ring in which the cavity extends only partially through a thickness of the ring at the outer surface of the ring stack, and fully through the thickness of the ring at a depth below the surface of the ring stack; and
        a second ring bounding the cavity at the surface of the ring stack;
    filling the molding cavity with resin contiguous with resin disposed on the outer surface of the ring stack to form a resin layer with an integral projection molded in the cavity; and then
    withdrawing the projection from the cavity; the projection comprising a touch fastener hooking structure having a stem extending from the resin layer to an overhanging head having a distal tip, the stem having a side surface facing the tip and formed against material of the first ring, and the tip formed against a ring on a side of the first ring opposite the second ring.

2. The method of claim 1, wherein the cavity extends into the second ring.

3. The method of claim 2, wherein the cavity extends only partially through a thickness of the second ring at the outer surface of the ring stack, and fully through the thickness of the second ring at a depth below the surface of the ring stack.

4. The method of claim 3, wherein the overhanging head has two oppositely directed distal tips formed against rings adjacent the two adjacent molding rings.

5. The method of claim 2, wherein side surfaces of the cavity are misaligned at an interface between the first and second rings.

6. The method of claim 2, wherein the cavity extends through three adjacent rings, including a middle ring in which the cavity is of a constant profile throughout a thickness of the middle ring.

7. The method of claim 1, wherein an opening of the cavity at the outer surface of the ring stack has a width, measured along the first ring, that is greatest at an interface between the first and second rings.

8. The method of claim 1, wherein the side surface of the stem facing the tip is formed against a surface of the first ring that is angled with respect to a side surface of the first ring.

9. The method of claim 1, wherein the withdrawn tip has a flange extending about a perimeter of the tip.

10. The method of claim 1, wherein the overhanging head comprises an arm overhanging the base layer in a single direction.

11. The method of claim 1, wherein the head comprises two arms overhanging the base layer in two, opposite directions.

12. The method of claim 1, wherein the ring stack defines multiple cavities, and wherein the withdrawn projection is one projection of an array of discrete projections molded to extend from the resin layer.

13. The method of claim 1, further comprising, after withdrawing the projection, deforming an upper surface of the projection against a heated surface.

14. The method of claim 13, wherein the overhanging head overhangs the base layer in a first direction, and wherein deforming the upper surface forms ridges overhanging the stem in a second direction perpendicular to the first direction.

15. The method of claim 13, wherein deforming the upper surface causes an underside surface of the head to curve toward the base layer.

16. A method of forming a touch fastener product, the method comprising
    molding a resin strip having a surface from which an array of resin projections integrally extends, each projection having
        a stem extending from the strip surface to
        a distal head having
            at least one arm extending laterally to overhang the strip, the arm having an upper surface extending from the stem to a distal tip; and
            a central cap overlying the stem; and
    plastically deforming the projections of the molded strip to raise the distal tips of the arms such that the distal tips of the arms project away from the strip surface, and such that the central caps project farther from the strip than inner portions of the upper surfaces of the arms; and then
    pressing downward on the resin projections with a heated surface that plastically lowers the raised distal tips of the arms and also melts the central caps, thereby forming male touch fastening elements extending from the strip.

17. The method of claim 16, wherein molding the resin strip comprises forming the projections by molding resin in closed cavities.

18. The method of claim 16, wherein the projections of the molded resin strip each have two, oppositely directed arms, with the cap of each projection disposed between the arms.

19. The method of claim 18, wherein the central cap forms a peak between the arms, and pressing downward on the resin projection causes resin of the peak to flow laterally.

20. The method of claim 16, wherein pressing downward on the resin projections forms ridges extending beyond the stems in a direction perpendicular to the arms, to overhang at least one side of each stem.

21. The method of claim 16, wherein after deforming, the distal tips of the arms of the projections extend farther from the strip surface than the central caps.

22. The method of claim 16, wherein the distal tips are formed with flanges extending about their perimeters, and wherein pressing downward on the resin projections melts the flanges at the upper surfaces of the arms while retaining the flanges under the arms.

23. The method of claim 17, wherein deforming the projections comprises pulling the projections from the closed cavities.

24. A method of forming a touch fastener product, the method comprising forming a resin strip having a surface from which an array of resin projections integrally extends, each projection having
    a stem extending from the strip surface to
    a distal head having
        at least one arm extending laterally to overhang the strip, the arm having an upper surface rising from the stem to a distal tip; and
        a central cap overlying the stem and projecting farther from the strip than an inner portion of the upper surface of the arm; and then
    pressing downward on the resin projections with a heated surface that plastically lowers the distal tips of the arms and also melts the central caps, thereby forming male touch fastening elements extending from the strip, wherein the distal tips are formed with flanges extending about their perimeters, and wherein pressing downward on the resin projections melts the flanges at the upper surfaces of the arms while retaining the flanges under the arms.

* * * * *